H. E. WALKER.
WHEEL.
APPLICATION FILED JULY 3, 1908.
974,320.
Patented Nov. 1, 1910.
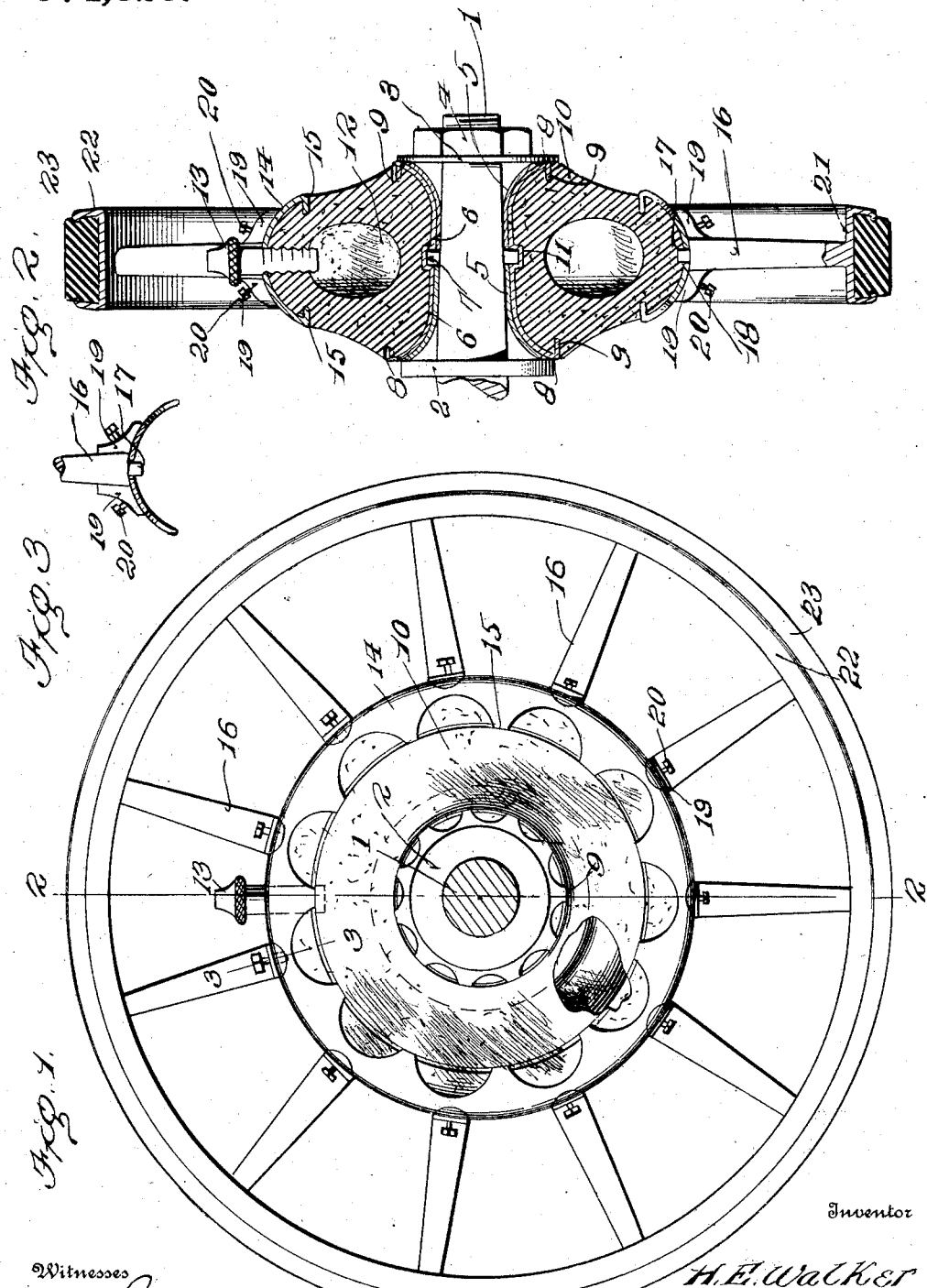

UNITED STATES PATENT OFFICE.

HORACE E. WALKER, OF DETROIT, MICHIGAN.

WHEEL.

974,320. Specification of Letters Patent. Patented Nov. 1, 1910.

Application filed July 3, 1908. Serial No. 441,822.

*To all whom it may concern:*

Be it known that I, HORACE E. WALKER, a citizen of the United States, residing at Detroit, in the county of Wayne and State of Michigan, have invented certain new and useful Improvements in Wheels, of which the following is a specification.

This invention relates to wheels and refers particularly to an improved resilient wheel designed to employ a pneumatic device which will take up all shock incident to the rolling of the wheel and which is not contacted with the ground.

The invention further embodies a wheel which is provided with a pneumatic cushion of peculiar construction and adaptation for insertion between the parts of a solid wheel which is designed to support loads of considerable weight and which is especially applicable to machines built for speed where it is necessary to provide means for absorbing the shock placed upon the rims of the wheels.

The invention still further contemplates the provision of an improved pneumatic hub which is so formed that a structure is had of considerable strength and one which admits of the economical manufacture of the wheel as the same can be readily assembled.

With these and other objects in view, this invention comprises certain novel combinations, constructions and arrangements of parts, shown in the accompanying drawings and particularly pointed out in the specification and claims.

For a full understanding of the invention, reference is to be had to the following description and accompanying drawings, in which, Figure 1 is a side elevation of the wheel, part of the same being shown in section; Fig. 2 is a section on the line 2—2 of Fig. 1; and Fig. 3 is a sectional view on the line 3—3 of Fig. 1, disclosing the location of the spokes upon the rim.

Corresponding and like parts are referred to in the following description and indicated in all the views of the drawings by the same reference characters.

In the drawings the numeral 1 designates an axle upon which the improved wheel is mounted. The axle 1 is provided with a collar 2, in the usual manner, disposed at the inner end of its spindle portion for engagement against the inner side of the wheel. A washer 3 is employed upon the outer end of the axle 1 to retain the wheel in position and is held in place by the provision of a nut 4 which is disposed in threaded relation upon the extremity of the axle 1.

The wheel structure comprises a bushing 5 in the form of a metal cylinder having flared extremities to provide bearing surfaces for the wheel against the collar 2 and the washer 3. The bushing 5 carries a sleeve 6 which is positioned about the bushing 5 and is conformed to the shape of the same. An annular bead 7 is struck up about the central portion of the sleeve 6 for a purpose hereinafter set forth. Owing to the formation of the bushing 5 and of the corresponding formation of the sleeve 6, the latter is prevented from longitudinal movement from the ends of the bushing 5; the opposite ends of the sleeve 6 are provided with ears 8 which are turned inwardly at their outer ends for engagement in annular grooves 9 formed in the opposite sides of a cushion 10. The cushion 10 is formed of rubber, rubber and canvas, or some like flexible material, composition thereof or combination of such materials which are adapted to prevent the passage of air under pressure therethrough and which are capable of withstanding considerable wear and pressure. The cushion 10 is so formed as to seat upon the sleeve 6 and has an annular recess 11 into which the bead 7 extends to further insure the rigid mounting of the cushion 10. An air chamber 12 is formed within the cushion 10 and extends throughout the same, air being introduced into the chamber 12 through a valve 13 radially extended from the cushion 10.

The cushion 10 is rounded at its periphery for the reception of a transversely curved rim 14 which snugly engages the cushion 10 and is secured thereto by a plurality of ears 15 depended from the opposite edges of the rim 14 and curved inwardly at their lower ends to engage in annular grooves formed in the opposite sides of the cushion 10. The rim 14 carries a plurality of radially extended spokes 16 which are provided at their inner ends with studs 17 for engagement through the rim 14 and into a peripheral groove 18 in the cushion 10. These studs 17 form not only a means for preventing the displacement of the spokes 16 but also act as a retaining means for the cushion 10 within the rim 14. To further secure the spokes 16 in position each spoke is provided with a pair of blocks 19 rigidly secured upon the opposite sides thereof, the blocks 19 each having a concaved under side to engage upon the face of the rim 14, and a locking screw 20 for engagement in the rim 14 to hold the blocks 19 rigidly thereto.

The outer extremities of the spokes 16 support a felly 21 having flanges 22 for engagement against the opposite edges of a tire 23. The tire 23 may be formed of any material suitable, but is preferably formed of solid rubber to deaden the rumbling of the wheel and to further the resilient qualities of the same.

With a wheel of this construction the use of pneumatic tires for contact with the roadway is eliminated and a structure is formed where an equal resiliency is obtained by positioning the air containing member toward the center of the wheel and out of contact with the roadway.

It is observed from this construction that all shock placed upon the tire of the wheel is absorbed through the improved cushion, and that a vibration is permitted between the rim and the sleeve irrespective of a movement of the supporting axle. The provision of the bead 7 and of the ears 8 and 15 prevent any lateral displacement of the cushion when side thrusts are exerted upon the wheel.

Having thus described the invention, what is claimed as new is:—

1. A wheel including a bushing having flared extremities, a sleeve snugly engaged about said bushing, a bead formed annularly about the central portion of said sleeve, a cushion engaged about said sleeve and having a groove formed in the inner face thereof for the reception of said bead, ears carried by said sleeve for engagement in annular grooves provided in the sides of said cushion, a rim secured against the periphery of said cushion, in-turned ears carried by said rim for engagement with said cushion, a plurality of spokes radially extended from said rim, a felly carried upon the outer ends of said spokes and tire mounted upon said felly.

2. In a wheel the combination with an axle, a collar disposed upon the inner end of the axle and a washer carried upon the outer end of the axle of a bushing mounted on the axle and having flared extremities for engagement against said collar and said washer, a sleeve located on said bushing and conformed thereto in shape, a cushion engaged over said sleeve, means carried by said sleeve for rigidly securing said cushion therethrough, a rim mounted upon said cushion, a plurality of spokes radially extended from said rim and a felly mounted upon the outer ends of said spokes.

3. A wheel including a bushing, a sleeve carried by said bushing, a cushion mounted on said sleeve, a bead formed on said sleeve for engagement in said cushion, ears carried by said sleeve for engagement with said cushion, a rim supported upon the periphery of said cushion, spokes radially extended from said rim and a felly mounted upon the outer ends of said spokes.

4. A wheel including a bushing, a sleeve mounted on said bushing, said bushing being flared at its opposite extremities to retain said sleeve in position, a cushion mounted about said sleeve, ears carried by said sleeve for engagement with said cushion, a rim secured to the periphery of said cushion, ears carried by said rim and engaged with said cushion, a valve radially positioned through the outer portion of said cushion, a plurality of spokes carried by said rim and a felly mounted upon the outer ends of said spokes.

5. A wheel including a cushion, means for supporting said cushion, a rim secured to the periphery of said cushion, spokes radially extended from said rim, studs formed upon the inner ends of said spokes for engagement through said rim, blocks carried by said spokes, set screws positioned through said blocks for engagement within said rim and a felly located upon the outer extremities of said spokes.

In testimony whereof I affix my signature in presence of two witnesses.

HORACE E. WALKER. [L. S.]

Witnesses:
WILLIAM C. SWAN,
JOSEPHINE WALKER.